(12) United States Patent
Violonchi

(10) Patent No.: US 8,300,293 B2
(45) Date of Patent: Oct. 30, 2012

(54) MICRO-OPTICAL BEAM-FORMING ARRAY FOR PROJECTING IMAGES OF A DIVERGENT ISOTROPIC CLOUD OF LIGHT POINTS, PRIMARILY FOR THE ENTERTAINMENT SECTOR

(76) Inventor: Ralf Violonchi, Kempen (DE)

( * ) Notice: Subject to any disclaimer, the term of this patent is extended or adjusted under 35 U.S.C. 154(b) by 554 days.

(21) Appl. No.: 12/449,179

(22) PCT Filed: Jan. 16, 2008

(86) PCT No.: PCT/DE2008/000084
§ 371 (c)(1),
(2), (4) Date: Aug. 26, 2009

(87) PCT Pub. No.: WO2008/089729
PCT Pub. Date: Jul. 31, 2008

(65) Prior Publication Data
US 2010/0002280 A1    Jan. 7, 2010

(30) Foreign Application Priority Data

Jan. 25, 2007  (DE) ............... 20 2007 001 100 U
Jun. 29, 2007  (DJ) ............... 20 2007 009 155 U
Jun. 29, 2007  (DJ) ............... 20 2007 009 156 U

(51) Int. Cl.
G02B 26/00      (2006.01)
G02B 26/08      (2006.01)

(52) U.S. Cl. ............ 359/238; 359/196.1; 359/204.5; 359/207.7

(58) Field of Classification Search ......... 359/237–238, 359/204.5, 201.1, 196.1, 207.7, 211.5, 211.6
See application file for complete search history.

(56) References Cited

U.S. PATENT DOCUMENTS 5,160,848 A * 11/1992 Saitoh et al. ............ 250/548
(Continued)

FOREIGN PATENT DOCUMENTS
DE        40 26 133        10/1991
(Continued)

OTHER PUBLICATIONS

International Search Report.

*Primary Examiner* — Dawayne A Pinkney
(74) *Attorney, Agent, or Firm* — Collard & Roe, P.C.

(57) ABSTRACT

The invention relates to a beam-forming array for projecting a divergent isotropic cloud of light points. The array comprises a source (4) for emitting electromagnetic radiation, a receiving or connecting possibility for a power source (2), an electrical or electronic subassembly (5), and an optical unit (6) that is arranged in a housing (1) along with the radiation source (4). The radiation source (4) is a semiconductor diode laser or a light emitting diode (LED) while the optical unit (6) is composed of at least two superimposed and grid-shaped spectral films that are offset relative to each other or a diffractive optical element. The optical unit (6) limits the intensity of the emitted radiation and the distance of the light point beams relative to one another to a value that does not pose any risk to a human eye. The invention has the advantage of providing a miniature portable array that is inexpensive to produce and easy to handle for a large spectrum of indoor and outdoor uses in order to project any clouds of light points, particularly of real constellations.

10 Claims, 3 Drawing Sheets

U.S. PATENT DOCUMENTS

Figure 1:
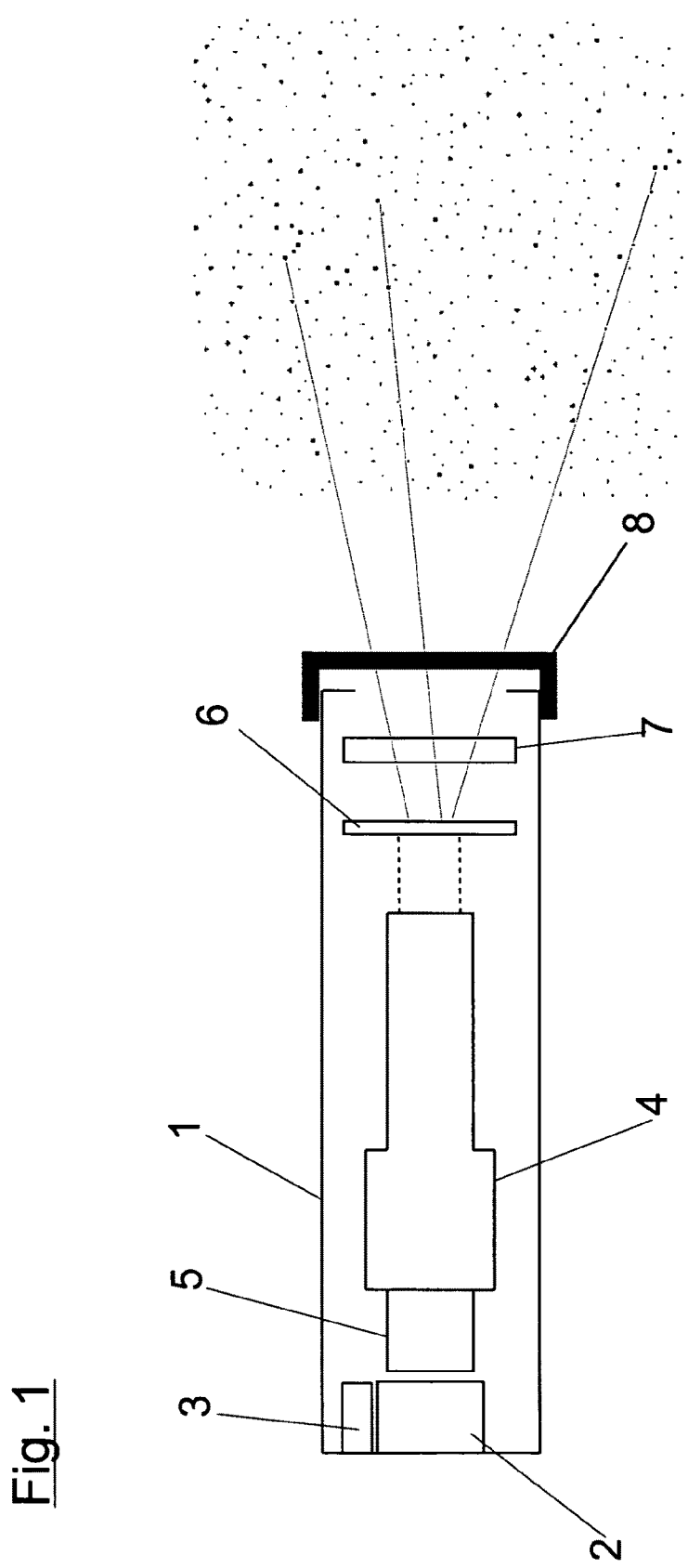

| | | |
|---|---|---|
| 7,150,552 B2 | 12/2006 | Weidel |
| 2002/0196639 A1* | 12/2002 | Weidel .......................... 362/521 |
| 2003/0141506 A1 | 7/2003 | Sano et al. |
| 2006/0044638 A1* | 3/2006 | Takagi ............................ 359/15 |

FOREIGN PATENT DOCUMENTS

| | | |
|---|---|---|
| DE | 40 34 661 | 5/1992 |
| DE | 199 30 821 | 2/2000 |
| DE | 10 2005 037 435 | 2/2007 |
| EP | 1 270 324 | 1/2003 |
| GB | 1 338 516 | 11/1973 |
| GB | 1 396 108 | 6/1975 |
| GB | 2 243 223 | 10/1991 |
| WO | WO 2007/014551 | 2/2007 |

* cited by examiner

MICRO-OPTICAL BEAM-FORMING ARRAY FOR PROJECTING IMAGES OF A DIVERGENT ISOTROPIC CLOUD OF LIGHT POINTS, PRIMARILY FOR THE ENTERTAINMENT SECTOR

CROSS REFERENCE TO RELATED APPLICATIONS

This application is the National Stage of PCT/DE2008/000084 filed on Jan. 16, 2008, which claims priority under 35 U.S.C. §119 of German Application No. 20 2007 001 100.8 filed on Jan. 25, 2007, German Application No. 20 2007 009 155.9 filed on Jun. 29, 2007, and German Application No. 20 2007 009 156.7 filed on Jun. 29, 2007. The international application under PCT article 21(2) was not published in English.

The invention relates to a micro-optical beam-forming array for projecting a divergent isotropic cloud of light points. The array is especially well-suited for application in the entertainment sector.

Beam-forming arrays for projecting an image of a starry sky have been known for a long time. They allow for the production of light-point clouds on spherical or also flat screens. In general the image projectors have the following structural properties: a source emitting light in the visible range of electromagnetic radiation, mounted in a housing and a device attached for splitting or forming the beam and a projection aperture in a wall of the housing which allows for the emission of the light-point cloud on the presentation surface. The beams emitted from the image projector are emitted divergently. The spectral working range of the projectors is generally between 0.38 µm and 0.78 µm. This makes an image presentation possible across the entire visible spectrum.

File no. DE 40 34 661 A1 describes a small projector for reproducing a cosmic object, for instance, a starry sky or the surface of a planet or satellite, on a screen with a rotating sphere illuminated from the inside on the surface of which there is an object layer with varying translucency to reproduce the object. The practically uncut hemisphere of the sky is accurately reproduced as a large-scale right-reading image on a flat screen. The stars are presented as translucent spots on a surface which is otherwise mirrored on the inside; the surface is covered by a rotating and transparent hollow sphere which is illuminated by a light source from the inside. The image of the stars is taken up through a fiber optic package attached to the object film and the resulting primary image is projected either directly through the film or through a lens onto the ceiling of the hall.

DE 199 30 821 A1 reveals a device for generating light effects by means of a laser, in particular for show and stage effects, but also as an inexpensive alternative to conventional lamps for living spaces with a laser and a deflection unit for the laser beam. The light effects device is an independent mobile device surrounded by a housing with the device having a part of the interior of the housing being equipped with a reflection plane of a mirrored-irregular surface and another part of the housing surface being a transparent and rough projection plane for reproducing an irregular image.

DE 40 26 133 A1 shows a device for generating light decoration which consists of a housing and a lighting device attached in the housing with a transparent cover on the front end of the housing and a plate, preferably with circular holes, located between the lighting device and the cover. The beams exiting through the holes of the plate are reproduced on the cover like a starry sky projected on a plane.

Emanating from DE 10 2005 037 435 A1 there is a device for switchable projection of images with diffractive optical elements which uses their properties for generating light-beams for light dispersion and/or light-forming to patterns and images. To move the light-beam over the diffractive optical elements a lens and mirror attached in the focus of the lens are used.

According to the state-of-the-art technology there are three different forms of a executing a beam-forming lighting array for image projection of a light-point cloud including a starry sky.

1. The use of a light-bulb as the source of the beam. A light-bulb emits, besides the visible light, by far the greatest portion of radiation in the nearby infrared range and can therefore by readily be viewed as a thermal radiator. By attaching a selective aperture mask certain ranges of the emitted radiation can be gated out and a multiple-beam light-point cloud be generated. This form of execution is normally unsuited for mobile use on account of the high amount of energy required and the limited lifespan of the lamps. A further disadvantage consists of the fact that due to the wave properties of light the image from small holes does not allow for sharp contrast.
2. The use of a light-emitting diode (LED) as the light source. An LED emits radiation in a limited spectral range, the light emitted is practically monochrome. The efficiency and the lifespan of this light source are significantly greater than those of conventional light-bulbs. The disadvantage is the relatively large distribution of the light-emitting chips so that a precise imaging of the light proves to be relatively expensive optically and a separate LED is required for every point of light.
3. The use of the semi-conductor diode laser as the light source. Diode-lasers are amongst the most efficient sources of light currently available and have an excellent degree of efficiency. Their brightness, collimation and coherence allow light effects to be generated by means of bending a coherent photon-beam to an optical grid. A further advantage of laser light sources is the almost Gauss-shaped intensity profile of the laser beam, which can be accurately modified in amplitude and/or phase through a corresponding micro-optical structure. The shaping of the complex intensity distributions of the laser beam is performed by diffractive optical elements (DOE), so that through light dispersion and light-forming appropriate patterns are made which by means of optical imaging elements which are mounted after the microscopic structures allowing a projection of an isotropic cloud.

The latter two forms of execution are of practical relevance for image projection. As a result of the continuing technical development, light sources with very strong optical performance are available. With the increasing use of these light sources in connection with diffractive optical elements (DOE) the intensity of light and the range of the beam-forming image projectors has increased by a number of orders of magnitude. As a result, the danger of damaging the eye with laser imaging projectors has increased by a number of orders of magnitude and the values are now exceeding the statutory limits for a optical safety. Known beam-forming image projectors emit a laser light-point cloud of high intensity which in general represents a potential danger for the human eye.

Such image projectors are finding increasing use in the field of entertainment so that through the exposure of the observer's eye to a laser light-point cloud it can be assumed that there is a significant degree of latent danger in the use of beam-forming image projectors by means of semi-conductor diode lasers. With the insufficient lighting conditions as is frequently the desired state for the use of light-forming image projectors in the field of entertainment, the eye adapts to the poor lighting conditions. The iris dilates to allow as much residual light as possible. The large diameter of the iris is directly associated with the increased probability of damage from the laser beam because the laser beam is focused directly on the retina through the pupil and may lead to irreparable optical and thermal damage of the retina.

Currently known beam-forming laser imaging projectors for light-point clouds have to be primarily classified as laser class 3B due to the light intensity caused or they must be correspondingly low power projectors. Laser class 3B is the second most dangerous level of laser systems. The radiation emitted is dangerous for the eyes and frequently dangerous for the skin as well. It is required by law that the use be registered at the guild and that a laser protection offer be appointed in writing. Persons should generally be kept away from the beam unless they are wearing suitable eye protection, clothing and gloves. The beam should be directed above or below the eyes. Constructive measures, such as blocks and bars which limit the horizontal and vertical panning range of the beam, should be used. Furthermore, identification of the hazardous area with standardized warning signs is required. When the laser equipment goes into operation it is required that optical and acoustical signals be given. The laser equipment has to have a locked switch to protect the laser from being used by unauthorized persons.

In practice, with the state-of-the-art technology, it is not reasonable to apply the statutory requirements for the operation of beam-forming laser class 3B imaging projection systems and it contradicts the actual purpose of the array.

The problems in the use of beam-forming laser image projection systems described above clearly demonstrate a need for action so as to minimize the dangers to people and animals.

The task of the invention is therefore to provide a beam-forming array for the projection of a divergent isotropic cloud that is not hazardous for the eye and can be given a laser classification that is user-friendly.

According to the invention the task is solved by a beam-forming array for the projection of a divergent isotropic cloud, consisting of a source for emitting electromagnetic beams, a pick-up or connection possibility for an energy source, an electric or electronic component and an optical unit, whereby the optical unit and the radiation source are located in a housing, and the radiation source is a semiconductor diode laser or a light-emitting diode (LED); the optical unit consists of at least two grid-shaped spectral films placed on top of each other or out of phase or of a diffractive optical element and the optical unit which limits the divergently emitted beams in its intensity and in the distance of the light-point beams to one another at a certain value which does not represent a hazard for the human eye.

The invention has the advantage that for a wide range of applications an inexpensively produced and easy-to-use array for the projection of any type of light-point cloud is provided in miniature form without its use representing a danger of injury to the human eye.

Preferred executions of the invention foresee a light intensity of the semiconductor diode laser of at least 5 mW, preferably 10 mW to 500 mW and by means of forming of the three dimensional structure of the diffractive optics of the light intensity and the distance to the light-point beams to one another the danger for the human eye is limited to a non-hazardous value.

In accordance with special forms of execution of the invention the array has a protective glass attached in front of the optical unit, a beam-enlarging lens which also serves as protective glass is attached in the beam after the diffractive optics.

Another form of execution foresees the exterior form of the light-point cloud being limited by a, preferably mobile mechanical and as an aperture functioning array.

One of the forms of execution of the invented array has grid-shaped spectral films placed out of phase at an angle of 45° and/or 22.5° and/or 11.25° and/or 5.625° and/or 2.8125° in front of the optical unit.

According to preferred forms of the invention the electronic component has a microcontroller and a control unit for the radiation source; the pick-up or connection for the energy source is executed as a battery or a plug contact and/or the available capacity of the energy source and the operation of the radiation source is displayed optically; the optical operational display is executed as a mono- or multi-colored LED display or as LC display; the housing has a diameter of von ca. 8 mm to 30 mm and the radiation power of the light-point beam is $\leq 1$ mW.

An especially preferred execution of the invention allows the array to project one or more constellations of stars on any shape of surface or a any shape of three dimensional object.

Figure 2:
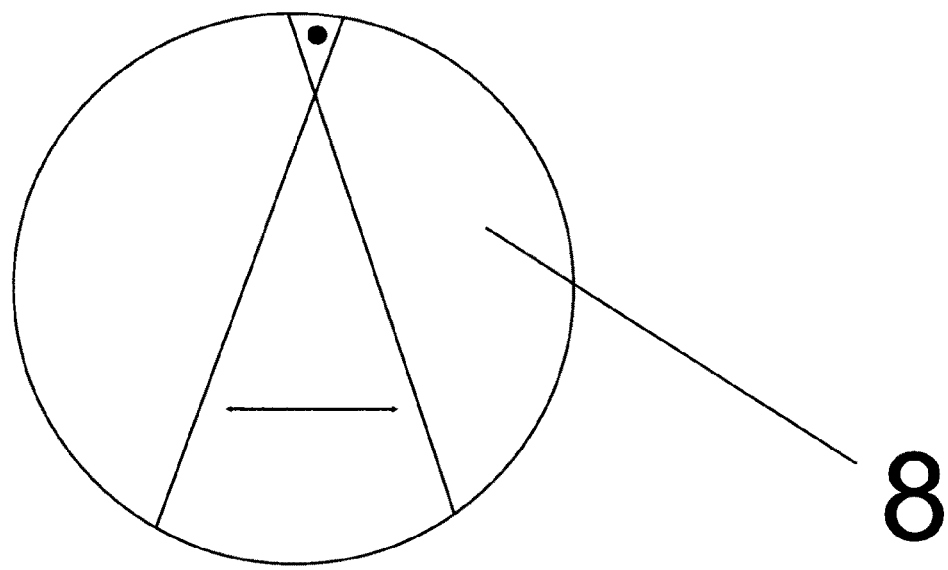
Figure 3:
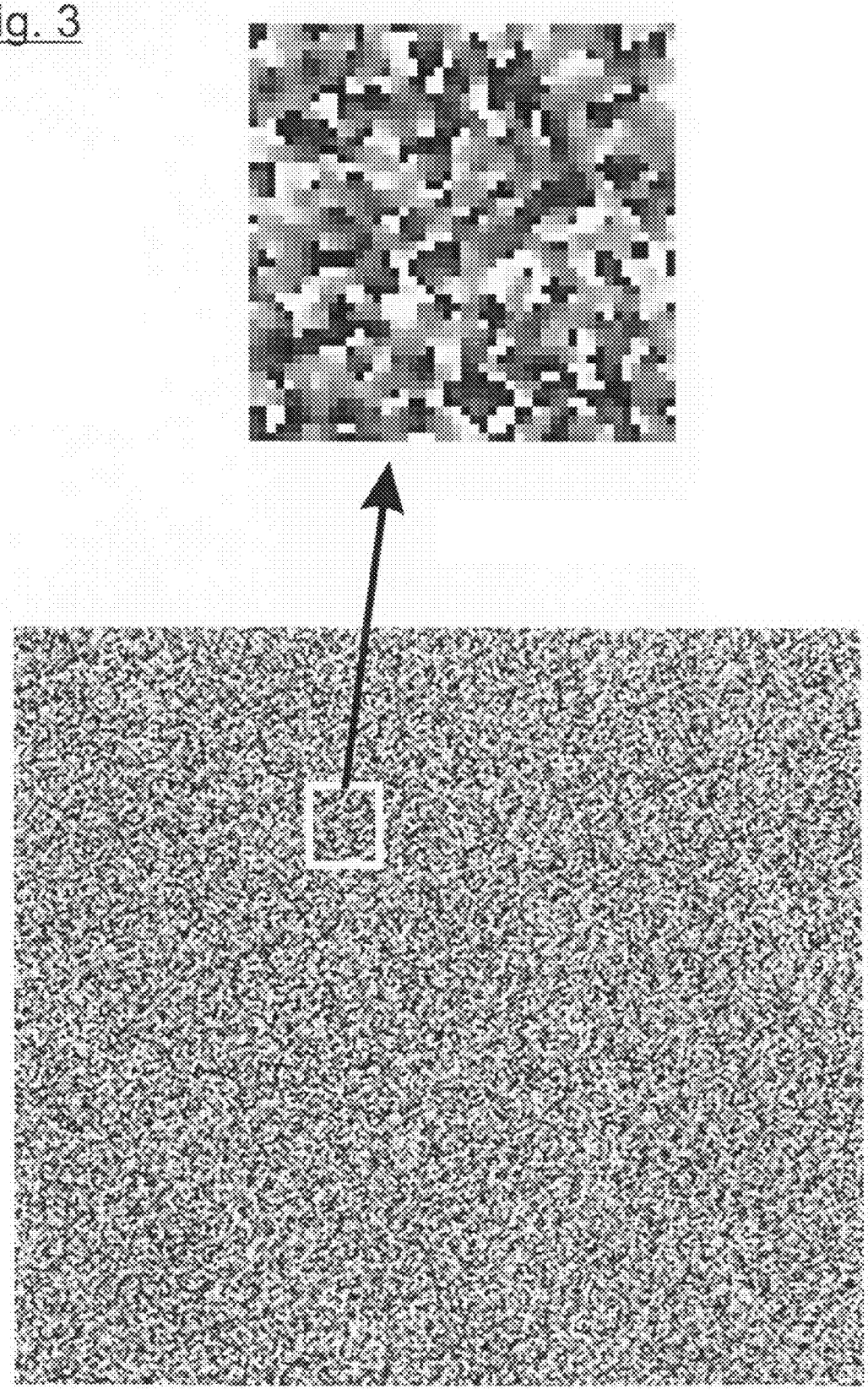

In the following the invention is shown in detail by means of a drawing. This shows:

FIG. 1 the basic construction of an invented array;

FIG. 2 a component of the invented array;

FIG. 3 the presentation of the mask of the diffractive optics used.

As can be seen in FIG. 1, a housing 1, which preferably has a diameter of ca. 20 mm, contains a pick-up or connection for an energy source 2, control device 3 and an electronic component 5. The light emitted by the light source 4 is beamed through the optical unit 6 and leaves the housing 1 through the protective glass 7. In this example the light source 4 is a semiconductor diode laser from Picotronic GmbH with a power of 10 mW. The light emitted has a wavelength of 532 nm. A 16-stage diffractive optics is used as the optical unit 6 in this example, the three-dimensional structure is formed with known means. The mask of the diffractive optics is shown in FIG. 3. The amplitude and the phase of the beam are modulated and secured through the diffractive optics so that a hazard for the human eye is excluded. The diffractive optical element (DOE) 6 enlarges the beam from the semiconductor diode laser in such a manner that the total intensity of the individual beams of the complex laser intensity dispersions id formed at a distance of 100 mm that pupils of eyes, located in the light range, with a diameter of 7 mm will only be illuminated with a maximum intensity of only 1 mW and therefore fulfill the requirements of DIN 60825. It is therefore possible to classify the invented array in laser class 2, despite a higher output. It is not hazardous for the eye or the user and therefore need not be registered.

With the aid of the limiting device 8 shown in FIG. 2 it is possible to restrict the beam exiting from the light source 4 in its spatial expansion to a desired form. In this manner the limiting device 8, whose bracket is attached to be movable, allows for the projection of a starry sky emitted by the optical unit in the geometric form of a Christmas tree and for the starry sky to be projected onto a natural Christmas tree. The device 8 may also be attached so it rotates above the diffractive optics and, for instance, is shaped like a spoked wheel with the effect that the laser beams are interrupted for a short time and therefore give the impression of blinking stars.

According to a special execution of the invention an enlarging lens (not shown here) can be placed in front of the optical unit 4. This allows, even with more powerful semiconductor diode lasers, for instance with 40 mW or 80 mW, the light emitted to be enlarged do that the array can be used without danger. Such an enlarging lens could also serve as protective glass 7 for the array.

Instead of a diffractive optics known spectral films with a line grid for generating a starry sky can be used as the optical unit 4. With the spectral films placed on top of one another at varying angles it is possible to project real constellations of stars. By means of placing rotatable spectral films at a distance to the spectral films placed on top of one another, it is possible to project a constellation which blinks.

Reference List

1 Housing
2 Energy source
3 Control device
4 Electromagnetic radiation source
5 Electrical/Electronic component
6 Optical unit
7 Protective glass
8 Limiting device

The invention claimed is:

1. Beam-forming array for the projection of a divergent isotropic cloud, comprising a semiconductor diode laser (4) for emitting electromagnetic radiation, a pick-up or connection possibility for an energy source (2), an electric or electronic component (5), an optical unit (6) for the modulation of the radiation emitted by the semiconductor diode laser (4), and grid-shaped spectral films placed out of phase at an angle of 45° and/or 22.5° and/or 11.25° and/or 5.625° and/or 2.8125° in front of the optical unit, whereby the optical unit (6) and the radiation source (4) are contained in a housing (1), wherein the optical unit (6) comprises at least two grid-shaped spectral films placed on top of each other or out of phase or of a diffractive optical element, the optical unit (6) limits the divergently emitted beams in its intensity and in the distance of the light-point beams to one another at a certain value which does not represent a hazard for the human eye, whereby the power of a light-point beam $\leq 1$ mW and, the radiation source (4) is a semiconductor diode with a power of at least 5 mW, preferably 10 mW to 500 mW.

2. Array in accordance with claim 1, wherein the diffractive optics are 16-stage optics and/or by means of forming the three-dimensional structure of the diffractive optics, the light intensity and the distance to the light-point beams to one another the danger for the human eye is limited to a non-hazardous value.

3. Array in accordance with claim 1, wherein the array has a protective glass (7) attached in front of the optical unit (6).

4. Array in accordance with claim 1, further comprising a beam-enlarging lens attached in the beam after the diffractive optics and this also serving as protective glass (7).

5. Array in accordance with claim 1, wherein the exterior form of the light-point cloud is limited by a, preferably mobile mechanical and as an aperture functioning array (8) or the array (8) can be rotated and preferably is spoked.

6. Array in accordance with claim 1, wherein the electronic component (5) has a microcontroller and a control unit for the radiation source (4).

7. Array in accordance with claim 1, wherein the pick-up or connection for the energy source (2) is executed as a battery or a plug contact and/or the available capacity of the energy source (2) and the operation of the radiation source (4) is displayed optically.

8. Array in accordance with claim 7, wherein the optical operational display is executed as a mono- or multi-colored LED display or as LC display.

9. Array in accordance with claim 1, wherein the housing (1) has a diameter from about 8 mm to 30 mm.

10. Array in accordance with claim 1, further comprising means of the array able to project one or more constellations of stars on any shape of surface or a any shape of three dimensional object.

* * * * *